United States Patent [19]

Pflieger

[11] Patent Number: 4,717,102
[45] Date of Patent: Jan. 5, 1988

[54] PIVOTAL CLAMP FOR CONNECTING MODULAR FURNITURE COMPONENTS

[75] Inventor: David C. Pflieger, Two Rivers, Wis.

[73] Assignee: Hamilton Industries, Two Rivers, Wis.

[21] Appl. No.: 870,889

[22] Filed: Jun. 5, 1986

[51] Int. Cl.$^4$ .............................................. A47B 96/06
[52] U.S. Cl. ................................. 248/228; 248/231.7; 248/316.1; 248/317; 248/72; 312/245
[58] Field of Search ............ 248/228, 225.31, 316.1, 248/316.2, 72, 231.7, 231.3, 229, 317, 72; 108/90, 97; 312/140.3, 195, 245

[56] References Cited

U.S. PATENT DOCUMENTS

| | | | |
|---|---|---|---|
| 750,595 | 1/1904 | Campbell | 248/250 |
| 759,560 | 5/1904 | Sharp | 248/231.7 |
| 1,213,059 | 1/1917 | Bachmann | 248/505 |
| 3,185,418 | 5/1965 | Appleton | 248/72 |
| 3,266,762 | 8/1966 | Evans | 248/72 |
| 3,333,799 | 8/1967 | Peterson | 248/14 |
| 3,445,081 | 5/1969 | Roussos | 248/72 |

FOREIGN PATENT DOCUMENTS 611338 10/1948 United Kingdom ................ 248/228

*Primary Examiner*—Reinaldo P. Machado
*Assistant Examiner*—Alvin Chin Shue
*Attorney, Agent, or Firm*—Tilton, Fallon, Lungmus

[57] ABSTRACT

A clamp particularly suitable for use in removably suspending cabinet units from the support rails of counters and other worktops. The clamp is generally J-shaped with an upstanding stem portion, an upper arm portion, and a hook-shaped lower arm portion. The upper arm portion terminates in a rib that projects towards the lower arm portion and also includes a threaded bore which extends along a line that is generally parallel with the lower arm portion and is spaced above the rib. A screw is threadedly received within the bore and, during use of the clamp, the upper arm portion is hooked over the flange of a support rail and the screw is tightened against the rail to pivot the clamp and to force the top wall of a cabinet unit, supported by the clamp's lower arm portion, upwardly into tight engagement with the rail.

12 Claims, 4 Drawing Figures

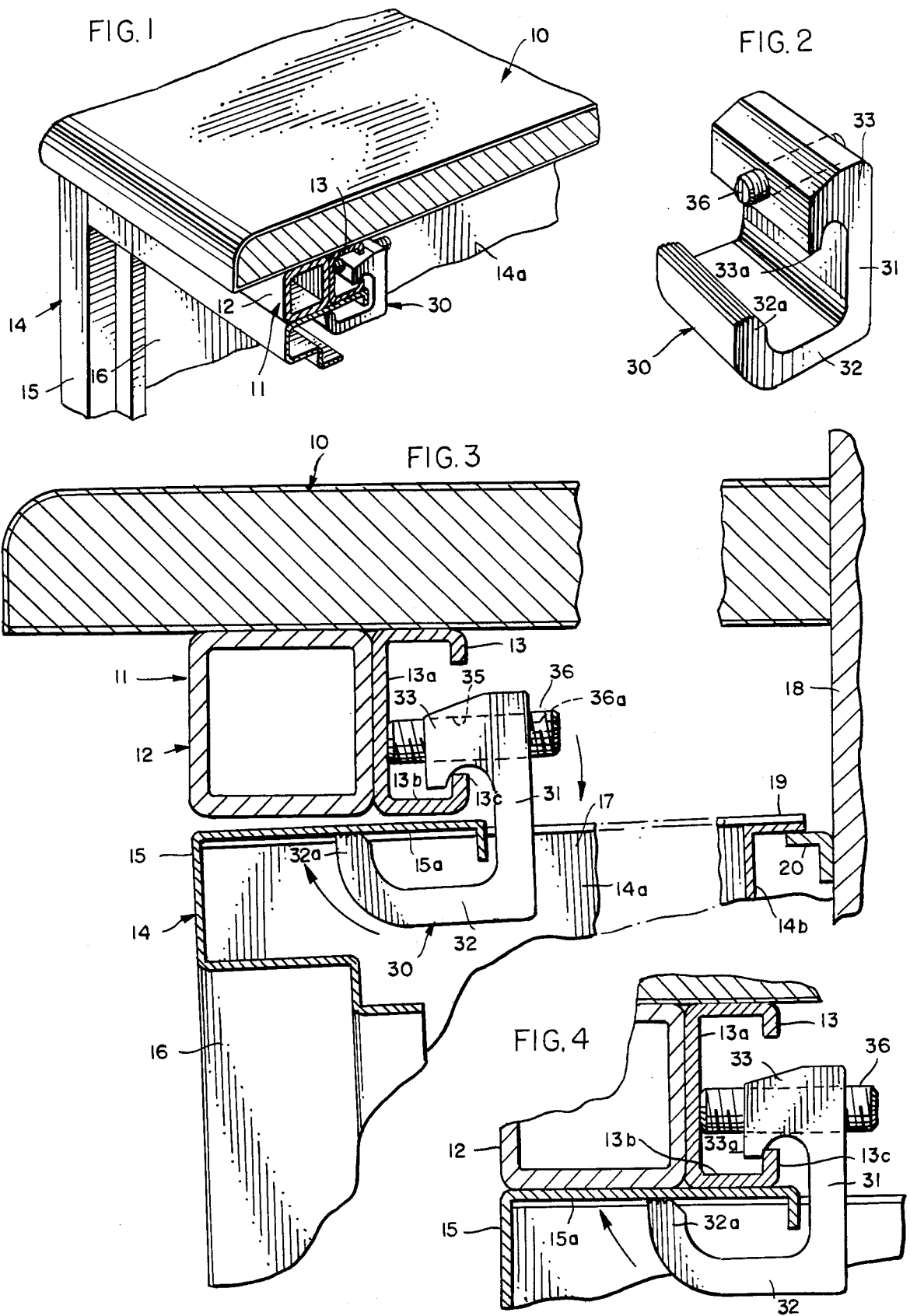

PIVOTAL CLAMP FOR CONNECTING MODULAR FURNITURE COMPONENTS

BACKGROUND AND SUMMARY

In modular furniture construction, such as the type of furniture used in laboratories and offices, cabinet structures (drawer units, door-equipped units, and shelf units) are often suspended from the worktops or their supporting rails. Where such units are screwed or bolted to the supporting structure, attachment is awkward and sometimes quite difficult because the connecting elements are not always readily accessible and the cabinet units are often heavy and difficult to support while the connecting points are being located and the screws or other connectors are being inserted and tightened. Also, the provision of fixed connecting points prevents or at least greatly limits the extent of adjustment in the position of a cabinet unit after the connectors have been inserted and before they are fully tightened.

Ideally, means should be provided for suspending a cabinet structure so that it may be moved laterally along the width of the worktop and, when the desired position is selected, the mounting means may then be easily tightened to draw the cabinet against the undersurface of the worktop in such a way that all gaps or seams between the parts are tightly closed and the facing surfaces of the parts are disposed in flush relation. While various types of mounting systems have been proposed to permit lateral adjustment of cabinet units, and while clamps of different construction have been disclosed in the prior art, the systems used in the past have fallen short of meeting all of these objectives either because of complexity, inconvenience of operation, or inability to achieve both adjustability and security of attachment. Reference may be had to U.S. Pat. Nos. 3,266,762, 3,185,418, 3,333,799, and 3,445,081 for various types of suspension clamps disclosed in the prior art.

An important aspect of this invention lies in providing a clamp which is simple in construction and operation and which allows a user to shift a loosely suspended cabinet into the desired location beneath the supporting rail of a worktop and then to tighten the clamp with a hex wrench or other suitable tool, causing the clamp to pivot and draw the cabinet unit upwardly into tight engagement with the rail structure. Two or more such clamps may be used depending on the width of the suspended cabinet unit. Since the screws for such clamps extend generally horizontally when the clamps are in use, and since such screws are spaced below the undersurface of the worktop adjacent the cabinet opening(s), such screws are readily accessible. Detachment of the cabinet structure is easily accomplished simply by reversing the procedure.

Briefly, the clamp is J-shaped (in elevation) with an upstanding stem portion, an upper arm or head portion, and a lower arm or foot portion. The upper arm portion is disposed above the lower arm portion and is provided with an integral rib that projects towards the lower arm portion, preferably towards a point intermediate the length of the lower arm portion. The upper arm portion also has a threaded bore that extends along a line generally parallel with the lower arm portion and spaced well above the lower end of the rib. The lower arm portion is provided with an upwardly-turned free end which terminates at an elevation substantially lower than the tip of the rib when the axis of the threaded bore is horizontally oriented.

When the clamp is used in suspending a cabinet module, the clamp's upper arm portion is hooked over the upstanding flange of a support rail or beam and the lower arm portion is fitted beneath a top frame member of the cabinet. The screw is rotated, preferably with a hex wrench, into engagement with the inside surface of the rail's front wall portion, causing the clamp to pivot about its line of contact with the upstanding flange and urging the top member of the cabinet module upwardly towards the underside of the rail or beam. With the screw in a partially tightened condition, a user may readily shift the module along the rail into any desired position beneath the worktop. When the module is located in its desired position, tightening of the screw is continued to complete the pivotal movement of the clamp and force the top surface of the module into tight engagement with the underside of the supporting rail or beam.

The clamp is of substantial width; in a preferred embodiment, its width approximates the length of the clamp's lower arm portion. If desired, the clamp may be of substantially greater width and, in that event, may be provided with a plurality of tightening screws. However, it is believed preferable, for ease of operation and effectiveness of result, to provide each clamp with only a single screw (located at a midpoint along the width of the clamp) and with a width that approximates the length of the lower arm portion, and then, where necessary, utilize two or more such clamps in suspending a cabinet module from a support rail.

DRAWINGS

FIG. 1 is a fragmentary perspective view illustrating a clamp and its operative relationship with a support rail and a cabinet structure.

FIG. 2 is an enlarged perspective view of the clamp.

FIG. 3 is an enlarged fragmentary sectional view illustrating the clamp in operative relation with its hex screw in partially tightened condition.

FIG. 4 shows the clamp of FIG. 3 with its screw fully tightened to secure a cabinet structure in suspended condition.

DETAILED DESCRIPTION OF PREFERRED EMBODIMENT

Referring to FIG. 1, the numeral 10 designates a worktop equipped with, and reinforced by, a supporting rail or beam assembly 11. In the illustration given, the assembly includes a box beam 12 and a channel beam or rail 13. The two may be welded together to provide rigid bracing for the worktop as well as rigid support for a cabinet structure 14 suspended beneath the beam assembly. For purposes of this invention, the configuration of the box beam and channel member is not critical, except in certain respects desribed below, and in fact the box beam may be omitted or replaced by a reinforcing element of different configuration.

With respect to the supporting beam or rail 13, the channel configuration is highly desirable but not essential. Of critical importance, however, is the fact that the support rail 13 have a front wall portion 13a, a rearwardly extending wall portion 13b, and a flange 13c that extends in the same direction as the front wall portion 13a.

The cabinet unit or module 14 may be of any of a variety of sizes and designs, all as well known in the art.

Ordinarily, such a cabinet unit has a perimetric rectangular front frame 15, side walls 14a, rear wall 14b, and a bottom wall (not shown). The front opening 16 defined by frame 15 may be fitted with a door (not shown). Alternatively, drawers may be mounted with the cabinet or open shelving may be provided therein (not shown). Since such elements are well known and do not constitute part of this invention, except in the respects noted below, further discussion of their non-critical aspects is believed unnecessary herein.

The perimetric front frame 15 includes an upper frame member 15a. The top of the cabinet unit is provided with an access opening 17 behind the top frame member 15a. Some means is provided by the cabinet unit to support its upper rear edge from a wall 18 (or wall panel structure); in the embodiment illustrated, the cabinet is provided with a rearwardly projecting top flange 19 which rests on a support beam 20 secured to the wall or wall panel.

As shown clearly in FIGS. 2-4, clamp 20 is generally J-shaped in side elevation, having an upstanding stem portion 31, a lower arm or foot portion 32, and an upper arm or head portion 33. The lower arm portion is longer than the upper arm portion and has an upwardly-turned free end 32a, preferably with a serrated or grooved end surface. The upper arm portion is provided with a depending integral rib 33a that is spaced from stem portion 32. As depicted most clearly in FIG. 4, a rib 33a projects towards a point intermediate the length of lower arm portion 32, preferably close to the midpoint of that arm.

The upper arm portion is also provided with a threaded bore 35 that extends through the clamp along a line generally parallel with lower arm portion 32. It is to be noted that bore 35 is spaced above rib 33a. A screw 36, preferably one that has a hexagonal socket 36a for receiving a conventional hex wrench (not shown) is threadedly received with bore 35.

Referring to FIG. 2, it will be seen that the clamp 30 is of substantial width. In the embodiment illustrated, its width approximates the length (i.e., forward-rearward dimension) of lower leg portion 32. While other dimensions may be provided, the width of the clamp is preferably no less than the length of lower arm portion 32. As shown in FIG. 2, screw 36 is located at a midpoint along the width of the clamp.

In use of the clamp, screw 36 is first rotated so that its forward end is retracted to a position near the front face of upper arm portion 33, rib 33a is then hooked over flange 13c of support rail 13, and the upper frame member 15a of the cabinet is placed over the upwardly-turned free end portion 32a of lower arm portion 32. Quite obviously, the sequence might be altered somewhat, with the upper frame portion 15a of the cabinet first being brought into the proximity of support rail 13, then followed by placement of the clamp into the position described. Such operations are facilitated if the rear of the cabinet may be first supported upon a beam 20 or other horizontal support; however, it is to be understood that for purposes of this invention such rear support, although desirable, is not essential.

Following preliminary suspension of the cabinet unit 14 from support rail 13, a user partially tightens screw 36 to pivot the clamp into the position shown in FIG. 3. In that condition, the clamp will support the cabinet by itself, freeing up both hands of the user for moving the unit into place. The cabinet may still be moved longitudinally along the elongated support rail 13 into a final lateral position of adjustment. When such adjustment is achieved, the user simply resumes rotation of screw 36, causing further pivoting the clamp until the top surface of cabinet frame member 15a tightly engages the underside of support rail 13 or, as shown in the drawings, the underside of the entire support beam assembly 11.

Use of the clamp therefore greatly simplifies the task of suspending a cabinet unit from a support beam. In addition to the other advantages described, the J-shape of the clamp allows it to be inserted in place from any point along the width of the unit, that is, it does not require it to be slid in from an open end of the cabinet unit or rail.

It is believed apparent from the foregoing that while the clamp has particular utility in suspending a cabinet module from a horizontal support rail or beam, the clamp might also have at least limited use in drawing a side frame member of a cabinet structure into tight engagement with a vertical support beam. In the foregoing, details of a preferred embodiment of the invention have been disclosed in considerable detail for purposes of illustration, but it will be understood by those skilled in the art that many of these details may be varied without departing from the spirit and scope of the invention.

I claim:

1. A clamp for securing a cabinet to a supporting rail which has a front wall portion, a rearwardly-extending wall portion, and a flange projecting from said rearwardly-extending wall portion and spaced behind said front wall portion; wherein said clamp is generally J-shaped with an upstanding stem portion, an upper arm portion, and a lower arm portion; said upper arm portion being disposed above said lower arm portion and terminating in a rib that projects towards said lower arm portion; said upper arm portion also having a threaded bore extending therethrough in a direction generally parallel with said lower arm portion and spaced above said rib; and a screw threadedly received in said bore; whereby when said lower arm portion is hooked beneath a top frame of a cabinet to be suspended from such rail, with said rib hooked over the flange of the rail, the tightening of said screw against such rail will cause said clamp to pivot and thereby lift said cabinet into tight engagement with the rail.

2. The clamp of claim 1 in which the width of said clamp is no less than the length of said lower arm portion.

3. The clamp of claim 1 in which said rib projects towards a point disposed intermediate the length of said lower arm portion.

4. The clamp of claim 3 in which said point is located in a mid-zone along the length of said lower arm portion.

5. The clamp of claims 1, or 3 in which said lower arm portion includes an upwardly-turned free end portion.

6. The clamp of claim 5 in which said upwardly-turned free end portion terminates at an elevation substantially lower than the lower end of said rib when the axis of said screw is horizontally disposed.

7. In combination with a support frame having a horizontal rail and a cabinet removably suspended from said rail, said cabinet including a top frame member having an underside and said rail including a front wall portion having a rear surface, a horizontal wall portion extending rearwardly from said front wall portion, and a flange projecting upwardly from said horizontal wall portion and spaced behind said front wall portion; a clamp of generally J-shape with an upstanding stem portion, an upper arm portion, and a lower arm portion; said upper arm portion having a downwardly-projecting rib that hooks forwardly and downwardly about said flange of said rail; said upper arm portion also having a generally horizontal threaded bore extending therethrough; a screw threadedly received in said bore having a forward end engaging said rear surface of said front wall portion of said rail, said lower arm portion of said clamp engaging said underside of said frame member of said cabinet and urging said frame member upwardly into tight engagement with said rail when said screw is tightened.

8. The combination of claim 7 in which the width of said clamp is no less than the length of said lower arm portion thereof.

9. The combination of claim 7 in which said rib projects towards a point along said lower arm portion intermediate the length thereof.

10. The combination of claim 9 in which said point is located in a mid-zone along the length of said lower arm portion.

11. The combination of claims 7 or 9 in which said lower arm portion includes an upwardly-turned free end portion.

12. The combination of claim 11 in which said upwardly-turned free end portion terminates at an elevation substantially lower than the lower end of said rib when the axis of said screw is horizontally disposed.

* * * * *